United States Patent [19]

Aoike et al.

[11] Patent Number: 4,635,052
[45] Date of Patent: Jan. 6, 1987

[54] LARGE SIZE IMAGE DISPLAY APPARATUS

[75] Inventors: Nanjou Aoike; Katsuyuki Ide, both of Yokohama; Hisao Kobayashi, Fujisawa; Mitsuhiro Hamaguchi, Yokohama, all of Japan

[73] Assignee: Toshiba Denzai Kabushiki Kaisha, Tokyo, Japan

[21] Appl. No.: 516,983

[22] Filed: Jul. 25, 1983

[30] Foreign Application Priority Data

Jul. 27, 1982 [JP] Japan ............... 57-130579

[51] Int. Cl.4 ............................................. G09G 3/00
[52] U.S. Cl. .................................. 340/811; 340/793; 340/805
[58] Field of Search ............... 340/703, 767, 771, 793, 340/805, 811, 711

[56] References Cited

U.S. PATENT DOCUMENTS

| | | | |
|---|---|---|---|
| 3,280,341 | 10/1966 | DuVall | 340/811 |
| 3,962,700 | 6/1976 | Criscimagna et al. | 340/711 |
| 4,009,335 | 2/1977 | Payne et al. | 340/767 |
| 4,241,294 | 12/1980 | Fisler | 340/767 |
| 4,367,464 | 1/1983 | Kurabashi et al. | 340/703 |
| 4,438,453 | 3/1984 | Alston | 340/703 |
| 4,442,428 | 4/1984 | Dean et al. | 340/703 |
| 4,495,445 | 1/1985 | Turney | 340/767 |

FOREIGN PATENT DOCUMENTS

46-5894 2/1971 Japan.
48-30797 9/1973 Japan.

Primary Examiner—Marshall M. Curtis
Attorney, Agent, or Firm—Schwartz, Jeffery, Schwaab, Mack, Blumenthal & Evans

[57] ABSTRACT

A large number of luminous display elements are arrayed on a board, and the quantity of light emitted by each display element is controlled in accordance with a video signal generated by a video signal generator. Each display element is constituted by a discharge lamp and a high frequency generator lighting the same.

12 Claims, 22 Drawing Figures

LARGE SIZE IMAGE DISPLAY APPARATUS

BACKGROUND OF THE INVENTION

This invention relates to a large size image display apparatus in which such images as television video signals or image signals are displayed on a display board including a large number of display elements.

In a conventional display apparatus of this type, a large number of incandescent lamps or a cathode ray tube is used as the display elements or element. However, such prior art display apparatus are not satisfactory in that the operating life of the lamps is relatively short, and in that the lamps consume a large amount of power and generate a large quantity of heat, thus requiring a large and expensive cooling means. Furthermore, a cathode ray tube is not only expensive, but also has difficulty producing a sufficient quantity of light.

Furthermore, an image display device utilizing discharge lamps, for example fluorescent lamps, which are a type of low pressure gas discharge lamp, has also been proposed as disclosed in Japanese Patent Publication Nos. 5894/1971 and 30797/1973. Discharge lamps have longer operating life and better light emitting efficiency than incandescent lamps and are of lower cost and can emit a larger quantity of light than can cathode ray tubes. However, in the display apparatus described in these patent publications, the discharge lamps are operated with DC voltage so that the following disadvantages arise. More particularly, the discharge lamps have a negative voltage-current characteristic so that it is necessary to use current limiting devices. When the discharge lamps are lighted with DC voltage as taught by the Patent Publications described above, it is necessary to use resistors as the current limiting devices with the result that the electric power loss and the concomitant heat generated by the resistors increase. Although the power loss and the quantity of heat generated by a resistor of a single discharge lamp are not so large, this results in a serious problem for a large size display apparatus utilizing several thousands to several tens of thousands of discharge lamps. For this reason, prior art display apparatus are not satisfactory.

When the discharge lamps are lighted with commercial AC voltage, inductors can be used as the current limiting devices whereby the problems of power loss and heat generation can be solved. This solution, however, causes the following problem. Taking a video signal of a television signal utilized in Japan as an image signal, since the video signal has a period of 1/60 second, 60 video signals are sent per second. Accordingly, in order to display such video signals, it is necessary to light each display lamp at each 1/60 second. Where the power source has a frequency of 60 Hz, it is necessary to control each discharge lamp to produce light at each cycle corresponding to the video signal. Control of the discharge lamp is necessary in order to produce a half tone color, so that where it is necessary to reproduce the video signal at a high fidelity, the number of stages of the color control must be increased. Generally, 8, 16 or 32 stages are used. Actually, the color control means is limited to phase control type. The inductor acting as the current limiting device and the load circuit of a discharge lamp can be considered as a well known L-R circuit and when AC voltage is impressed across such L-R circuit, as is well known in the art, current i expressed by the following equation flows.

$$i = Im \sin(\omega t + \theta - \phi) - Im \sin(\theta - \phi)$$

$$\epsilon^{-R/L \cdot t} = is + it$$

where
 $\theta$: switch on phase angle
 $\phi$: power factor angle of the circuit $(\tan - 1\omega L/R)$
 $is$: steady current
 $it$: transient current As can be noted from this equation, a transient oscillation occurs in the L-R circuit upon closure of a source switch so that transient current flows which attenuates with a time determined by a constant R/L. Thus, the time determined by R/L elapses before the current becomes until steady, that is steady state is reached. For this reason, when lighting discharge lamps with commercial voltage, the lamp current contains transient current at the time of applying the voltage and such transient current does not attenuate sufficiently in one cycle of the commercial source voltage. As a consequence, the lamps do not reach steady state in one cycle, thus making it difficult to provide a predetermined light control or light output. In other words, this affects the response characteristic. Where large numbers of discharge lamps and current limiting devices are used as above described, the degree of light control of respective discharge lamps would not be constant because the characteristics of the discharge lmaps and of the current limiting devices are not always the same. Such imbalance between the degrees of light control among numerous discharge lamps results in a serious problem where an image is displayed with colors. As can be noted from the equation, where the switch-ON phase angle and the circuit power factor angle coincide with each other no transient current flows. However, as a large number of stages are used for light control and an extremely large number of discharge lamps are used, it is impossible to make equal the switch-ON phase angle and the power factor angle. Thus, where many discharge lamps are operated by a commercial AC source voltage, it is impossible to obtain a desired light output corresponding to a video signal in synchronism therewith. There is another problem that the degrees of light control varies between discharge lamps.

SUMMARY OF THE INVENTION

It is therefore an object of this invention to provide a novel large size image display apparatus capable of producing a sufficiently large light output while at the same time decreasing power consumption and heat generation.

Another object of this invention is to provide a large size image display apparatus utilizing a large number of discharge lamps and having an excellent response characteristic to video or image signals and capable of making substantially equal the degrees of light control of respective discharge lamps.

According to this invention, there is provided image display apparatus comprising a display board on which a number of luminous display elements are arrayed; means for generating a video signal; and control means for controlling the intensity of respective display elements in accordance with the video signal for each image to be displayed, wherein each display element includes a discharge lamp and a high frequency generator connected to energize the discharge lamp.

DESCRIPTION OF THE PREFERRED EMBODIMENTS

Figure 1:
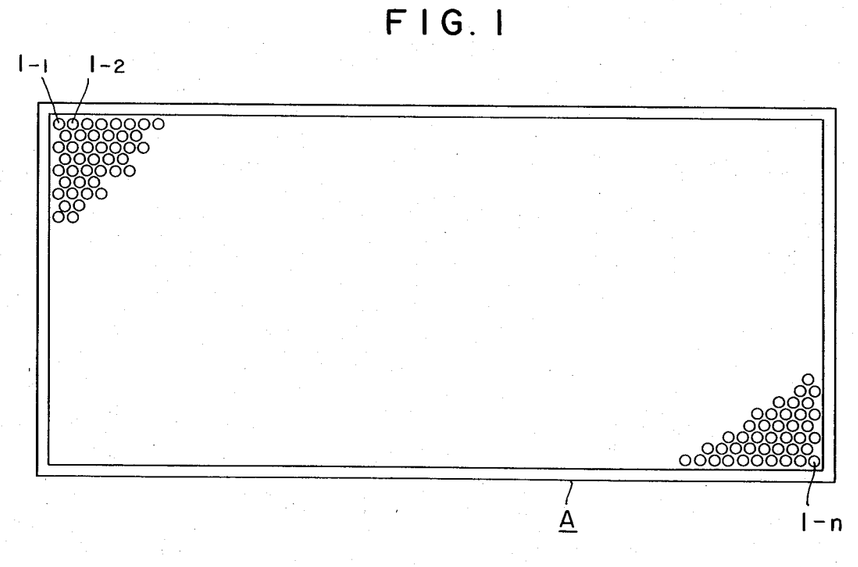
FIG. 1 is a front view showing one embodiment of the image display apparatus embodying the invention.
Figure 2:
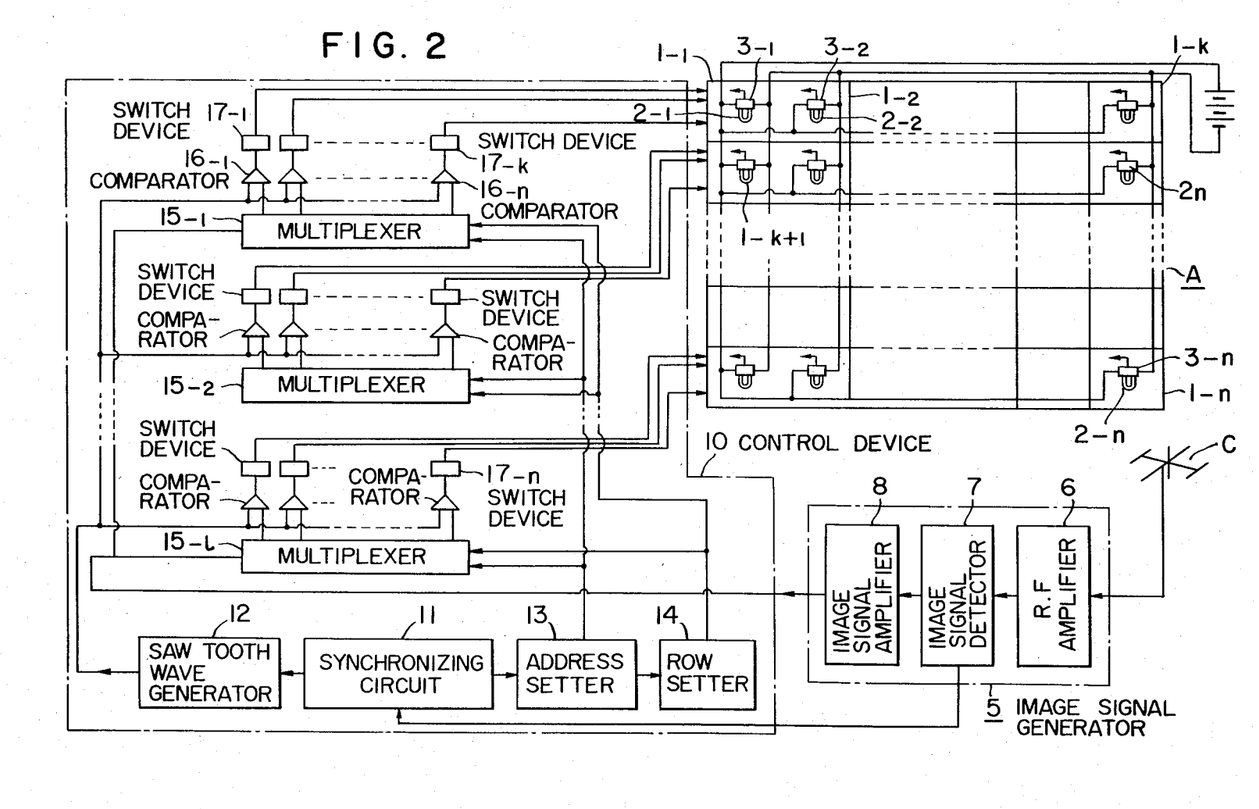
FIG. 2 is a block diagram showing the electric connection of the embodiment shown in FIG. 1.
Figure 3:
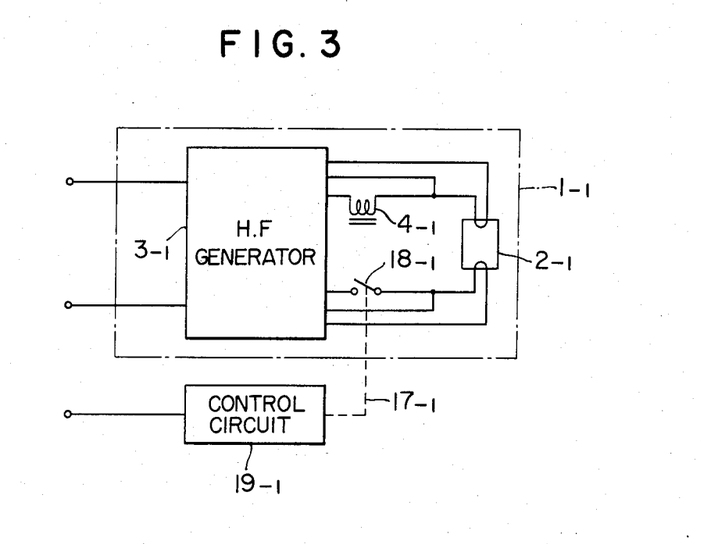
FIG. 3 is a block diagram showing one example of the display element utilized in this invention.

The embodiment of this invention shown in FIGS. 1 through 4 is used to display white and black video signals and comprises several thousands to several tens of thousands of display elements $1_{-1}, 1_{-2}, \ldots 1_{-n}$ which are arrayed on an electroluminescent board A which is installed in a baseball park, for example, and has a sufficiently large size so that it can be viewed from a remote point spaced several tens of meters or more away. As shown in FIG. 3, the display element $1_{-1}$ comprises a discharge lamp $2_{-1}$, for example a low pressure gas discharge lamp such as a fluorescent lamp, and a high frequency generator $3_{-1}$ for energizing the discharge lamp $2_{-1}$. The high frequency generator $3_{-1}$ generates a high frequency voltage of 30 KHz, for example. A current limiting device $4_{-1}$ is provided for each discharge lamp $2_{-1}$, which may be an inductor, a capacitor or a combination thereof. However, use of a resistor as the current limiting device should be avoided because it increases power loss and heat generation.

Other display elements $1_{-2}, \ldots 1_{-n}$ also have the same construction as the display element $1_{-1}$. In FIG. 2, reference numeral 5 designates an image signal generator which generates a video signal of a television signal or a cinema signal or the like to be displayed on the electroluminescent display board A. In this embodiment, however, it is assumed that it generates a video signal. The image signal generator 5 illustrated comprises a radio frequency amplifier 6 which amplifies a signal received by an antenna C, an image signal detector 7 and an image signal amplifier 8. The image signal generator 5 of such construction is well known in the art. A control device 10 is provided to control the intensity of light generated by the display elements $1_{-1}, 1_{-2}, \ldots 1_{-n}$ in accordance with the image signal at each frame of the image signal having a period of 1/60 sec. in this embodiment to display the image on the electroluminescent display board A. In other words, the control device 10 controls the light intensity outputs of the display elements $1_{-1}, \ldots 1_{-n}$ in accordance with white and black brightness information contained in the image signal. The light intensity is controlled in 8, 16 or 32 stages or continuously.

The control device 10 shown in FIG. 2 comprises a synchronizing circuit 11 forming a synchronizing signal in accordance with an output of the image signal detector 7 of the image signal generator 5, a saw tooth wave generator 12 controlled by the output of the synchronizing circuit 11 for producing a saw tooth wave in synchronism with the image signal, an address setter 13 controlled by the output of the synchronizing circuit 11 for setting the addresses of the display elements $1_{-1}-1_{-k}$ arranged on one row of the electroluminescent control board, a row setter 14, which when the address setter 13 completes outputting of address signals for the display elements $1_{-1}-1_{-k}$, shifts the control to the next row of elements a plurality of multiplexers $15_{-1}-15_{-l}$ coinciding in number with the rows of the electroluminescent board A and supplied with the image signal from the image signal generator 5, comparators $16_{-1}-16_{-n}$ respectively comparing the image signal with the saw tooth wave, k comparators being provided for each multiplexer, and switch devices $17_{-1}-17_{-n}$ which respectively control the display elements $1_{-1}-1_n \ldots$ in accordance with the outputs of the comparators $16_{-1}-16_{-n}$. Respective component elements of the control device 10 are well known in the art. Each of the switch devices $17_{-1}-17_{-n}$ comprises a switch $18_{-1}$ connected between the high frequency generator $3_{-1}$ and discharge lamp $2_{-1}$ and a control circuit $19_{-1}$ ON.OFF controlling the switch $18_{-1}$ just like the switch device $17_{-1}$ illustrated in FIG. 3.

The control device 10 and the image signal generator 5 are contained in or mounted on the display board A or housed in a remote control room, not shown.

Figure 4A:
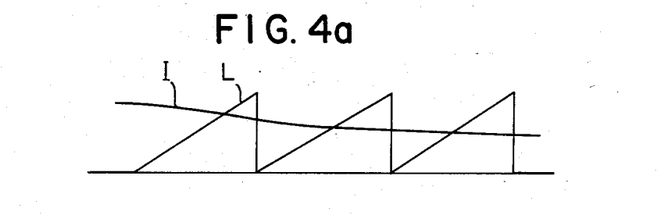
FIGS. 4a, 4b and 4c show waveforms useful to explain the operation of the embodiment shown in FIGS. 1 and 2.
Figure 4B:
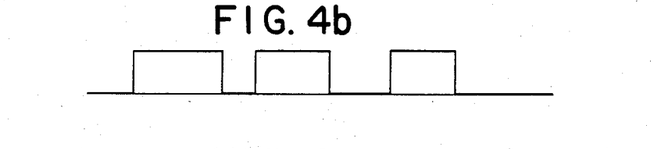
Figure 4C:
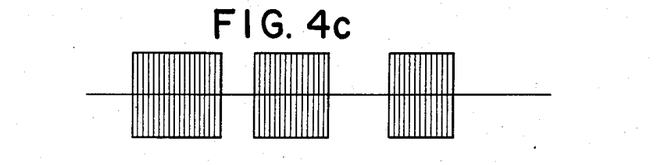

In operation, let it be supposed that the multiplexer $15_{-1}$ is controlled by the address setter 13 and by the row setter 14 for supplying a signal I shown in FIG. 4a acting as the image signal for one display element $1_{-1}$. Then comparator $16_{-1}$ compares the signal I with the output L, shown in FIG. 4a, of the saw tooth generator 12. As a result of comparison, the comparator $16_{-1}$ outputs a signal (shown in FIG. 4b) which determines the time of supplying (i.e., the duty cycle of) high frequency voltage to the display element $1_{-1}$. In response to the output of the comparator $16_{-1}$, the switch device $17_{-1}$ controls the supply of the high frequency voltage to the discharge lamp $2_{-1}$, as shown in FIG. 4c. More particularly, the magnitude of signal I shown in FIG. 4a represents the brightness of the displayed image. Thus, the time for supplying the high frequency voltage to the discharge lamp $2_{-1}$ is lengthened in accordance with the magnitude of signal I to output more light so as to make the displayed color approach white, whereas when the magnitude of signal I is small, the light output is decreased so as to make the displayed color approach black. Since the period of the saw tooth wave L is obtained from the televison signal by the synchronizing circuit 11, the light output of the discharge lamp $2_{-1}$ varies according to the period of the image signal. Other discharge lamps $2_{-2}-2_{-n}$ are similarly controlled. When the display of the first row completes the row setter 14 designates the multiplexer $16_{-2}$ of the second row for controlling the display elements thereof. Upon completion of the control of the lth row, one frame of the image signal is completed and in the succeeding frames the operations described above are repeated to display a television image on the display board A.

Figure 5:
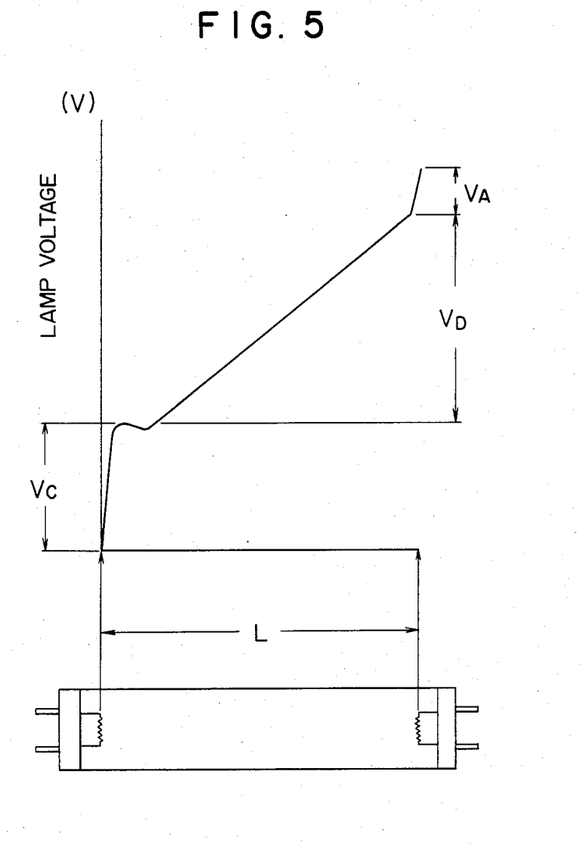
FIG. 5 is a graph showing voltage components of the voltage applied to a fluorescent lamp.

In this embodiment, since the output frequency of the high frequency generator $3_{-1}$ was selected to be 30 KHz, the following advantages can be obtained. The tube length of the discharge lamp can be made a small as necessary for the purpose of decreasing the size of each picture element. Where a short fluorescent lamp is used as the discharge lamp and where it is lighted with high frequency voltage having a frequency higher than 20 KHz, the efficiency of the lamp can be improved greatly. As shown in FIG. 5, the voltage $V_L$ impressed upon a fluorescent lamp is equal to the sum of the cathode drop $V_C$, arc drop $V_D$ and the anode drop $V_A$, and it has been found that the anode drop $V_A$ can be greatly decreased when the lamp is energized with high frequency voltage. Although this reason is not yet clearly understood, it is believed that as the frequency increases the lamp voltage $V_L$ decreases by an amount equal to the anode drop $V_A$ and as the lamp power decreases the luminescence efficiency increases because the distance L between the electrodes is constant. Accordingly, in a discharge lamp utilized in an image display device, in which the tube length is small and the ratio of lamp voltage $V_L$ to anode drop $V_A$ is large, the luminescent efficiency can be improved proportionally. For example, when a fluorescent lamp, having a tube diameter of 15.5 mm, length of 125 mm and bent into a U shape, is lighted with a voltage of 50 Hz, the lamp voltage is about 10 V, whereas when the lamp is operated with a voltage of 30 KHz, the lamp voltage increases to about 28 V.

Figure 6:
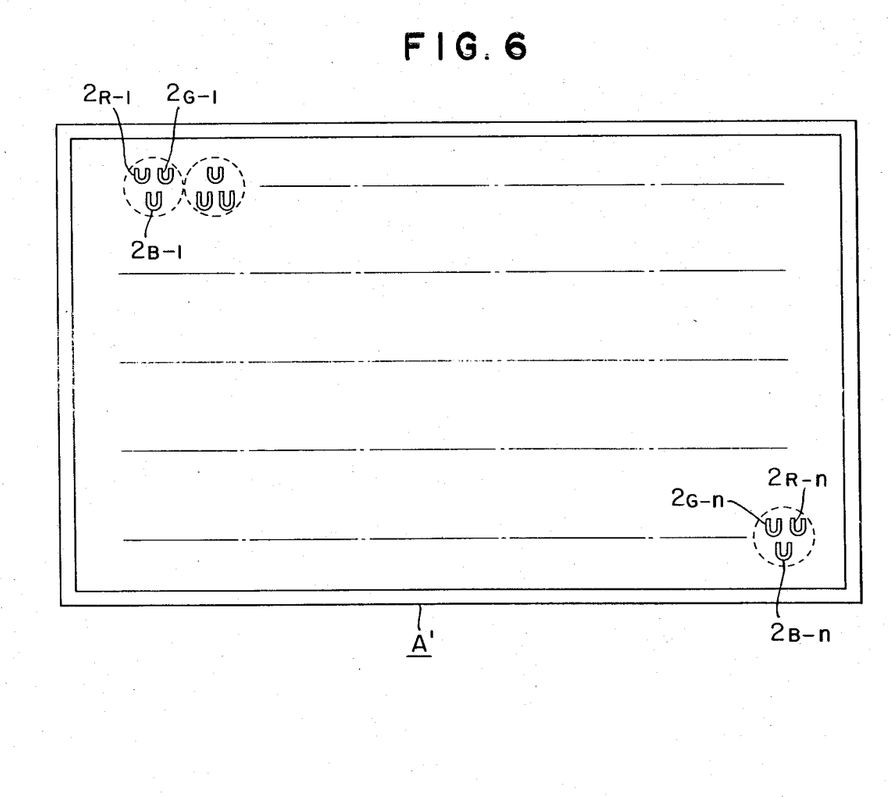
FIG. 6 is a front view showing a modified display board embodying the invention.
Figure 7:
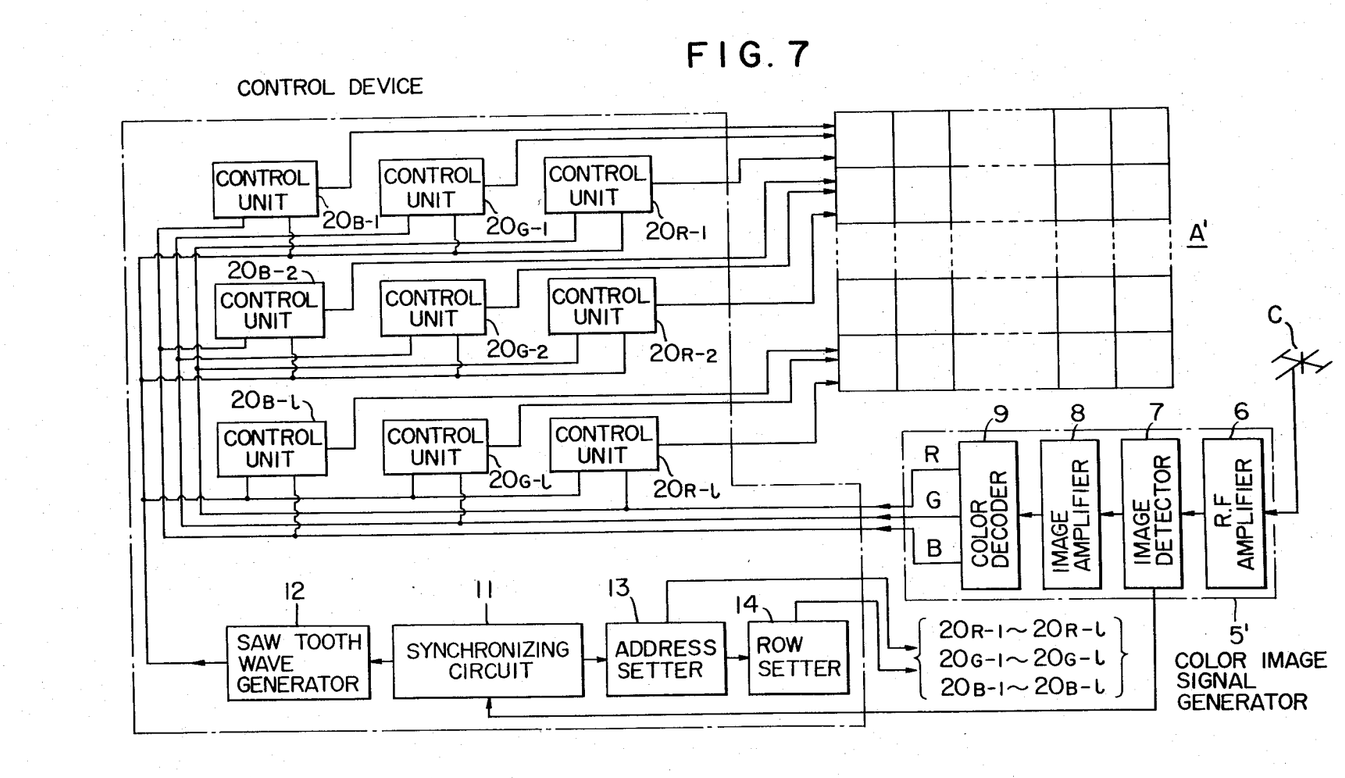
FIG. 7 is a block diagram showing the electric connection of the modification shown in FIG. 6.

FIGS. 6 and 7 illustrate another embodiment of this invention adapted to display color video signals. In FIG. 7 elements corresponding to those shown in FIG. 2 are designated by the same reference characters, provided that the multiplexers, comparators and switch devices are shown by single blocks 20 (hereinafter termed control units). In this embodiment since a color display is made, a color decoder 9 is provided for a color image signal generator 5' for deriving a red color signal R, a green color signal G and a blue color signal B. Such a color decoder has been well known, for example Type ICD-701 color decoder sold by Ikegami Tsushinki Kabushiki Kaisha, Japan. The outputs R, G and B are respectively sent to control units $20_{R-1}$–$20_{R-l}$, $20_{G-1}$–$20_{G-l}$ and $20_{B-1}$–$20_{B-l}$ corresponding to respective rows. These control units control the brightness of discharge lamps $2_{R-1}$–$2_{R-n}$, $2_{G-1}$–$2_{G-n}$ and $2_{B-1}$–$2_{B-n}$ in the same manner as in the previous embodiment. As shown in FIG. 6, of these discharge lamps, discharge lamps $2_{R-1}$, $2_{G-1}$ and $2_{B-1}$ respectively emitting red, green and blue color lights are disposed closely adjacent to constitute a picture element. In the same manner, discharge lamps $2_{R-2}$, $2_{G-2}$ and $2_{B-2}$ constitute another picture element, these picture elements being arrayed in rows and columns so as to obtain a color display. In this embodiment, three discharge lamps constituting one picture element may be contained in a cylindrical casing. Regarding other respects, the modification shown in FIGS. 6 and 7 operates in the same manner as in the first embodiment.

FIGS. 8–12 show some examples of the high frequency generator, in which reference numeral 30 designates a discharge lamp, for example a fluorescent lamp, 31–35 designate current limiting devices, and E designates a DC source. The high frequency generator 40 shown in FIG. 8 comprises a transistor inverter including a pair of transistors $T_{r1}$ and $T_{r2}$ connected in parallel. The high frequency generator 41 shown in FIG. 9 comprises a transistor inverter constituted by a single transistor $T_{r3}$. The high frequency generator 42 shown in FIG. 10 comprises a transistor inverter made up of a pair of serially connected transistors $T_{r4}$ and $T_{r5}$, whereas the high frequency generator 43 shown in FIG. 11 comprises a pair of transistors $T_{r6}$ and $T_{r7}$ which are alternately turned ON and OFF to cause a capacitor C and inductor L, also acting as a current limiting device 34 to produce an oscillation voltage. The high frequency generator 44 shown in FIG. 12 comprises a thyristor inverter including a pair of parallelly connected thyristors $SCR_1$ and $SCR_2$. Since the operations and constructions of the high frequency generators shown in FIGS. 8 through 12 are well known, their description will not be made herein. The DC source E shown in these figures may be a battery, or a rectifier with a filter. The current limiting devices 31, 32 and 35 shown in FIGS. 8, 9 and 12 may be replaced with leakage inductors provided for the output transformers $T_1$, $T_2$ and $T_3$ of the high frequency generators 40, 41 and 44. Furthermore, the transistors $T_{r1}$–$T_{r7}$ and thyristors $SCR_1$ and $SCR_2$ may be of so-called self-exciting type in which their switching actions are controlled by their own oscillations, or may be of so-called separate exciting type in which their switching actions are controlled by external signals.

Figure 13:
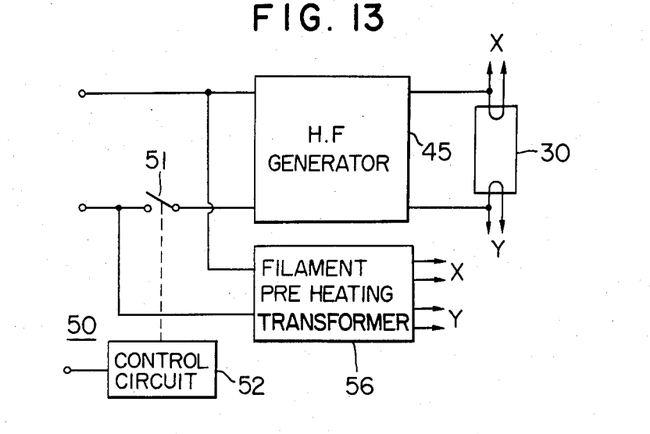
FIGS. 13, 14 and 15 are block diagrams showing some examples of the switch device.
Figure 14:
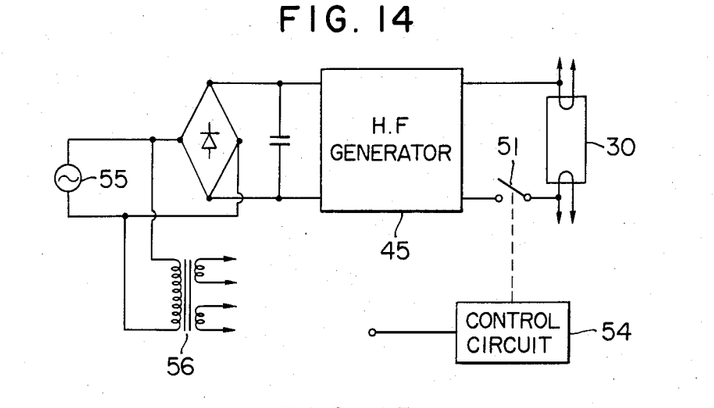
Figure 15:
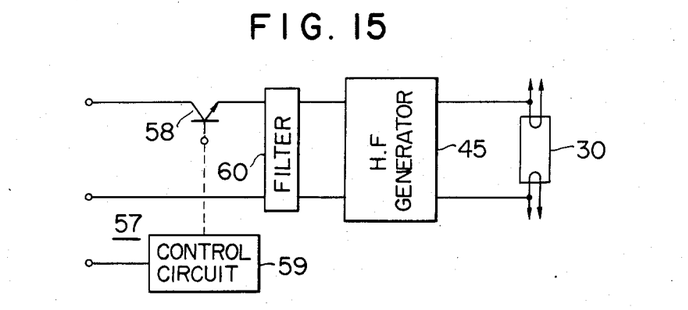

FIGS. 13–15 show examples of apparatus for controlling supply of high frequency voltage to a discharge lamp, in which reference numeral 30 designates the discharge lamp and 45 a high frequency generator which may be one of those shown in FIGS. 8–12, and 56 a cathode heating transformer.

The switch device 50 shown in FIG. 13 comprises a switch 51 that controls a power input to the high frequency generator 45 and a control circuit 52 which controls the switch 51 which may be constituted by such semiconductor switching element as a transistor or a gate turn-OFF transistor or the like. In this example, the cathode electrodes of the discharge lamp 30 are heated by a filament preheating transformer 56.

The control circuit 52 of the switch 51 is controlled by the output of the comparator shown in FIG. 2. The switch device 57 shown in FIG. 15 comprises a switching transistor 58 connected on the input side of a high frequency generator 45, a control circuit 59 ON.OFF controlling the switching transistor 58 and a filter 60 connected between the switching transistor 58 and the high frequency generator 45. Thus, the high frequency voltage supplied to the discharge lamp 30 is controlled by controlling the ON.OFF period of the switching transistor 58 in accordance with the image signal. Instead of controlling the input or output of the high frequency generator, its operation may be controlled. More particularly, in the circuits shown in FIGS. 8–12, supply of the control signals to the transistors $T_{r1}$–$T_{r7}$ and thyristors $SCR_1$ and $SCR_2$ may be controlled.

Although in FIGS. 8 through 15, one high frequency generator was provided for one discharge lamp, two or more discharge lamps can be energized from one high frequency generator.

Figure 8:
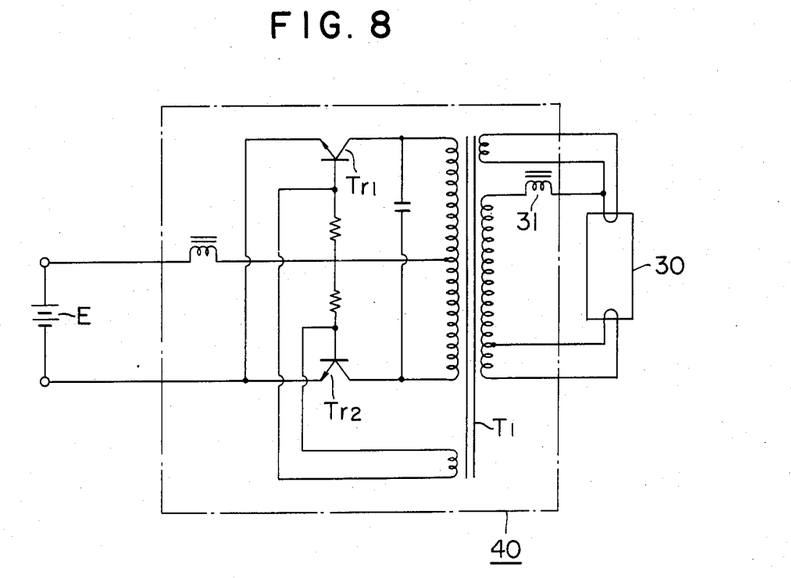
FIGS. 8, 9, 10, 11 and 12 are connection diagrams showing various types of high frequency generators.
Figure 9:
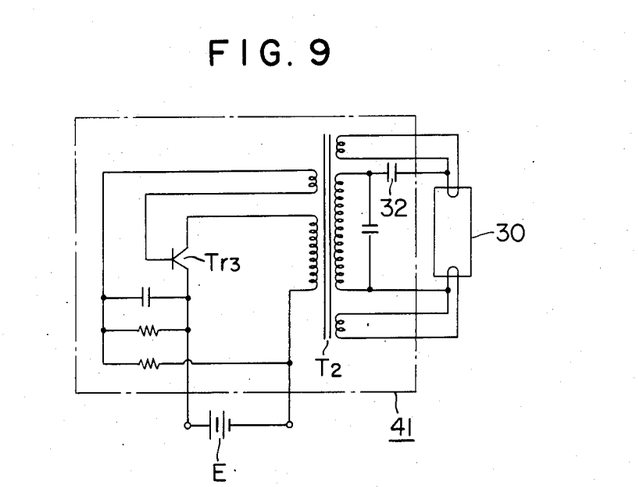
Figure 10:
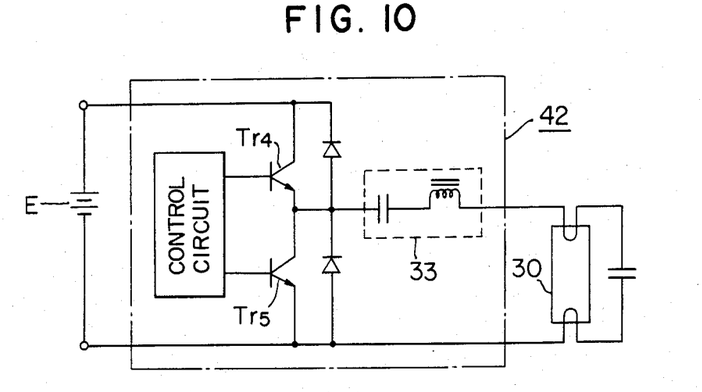
Figure 11:
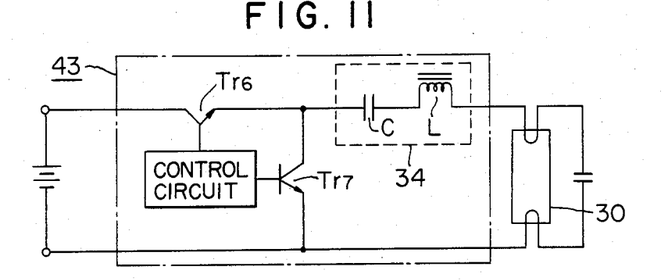
Figure 12:
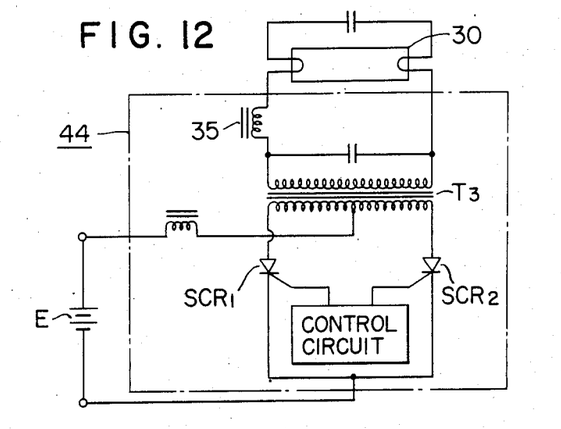
Figure 16:
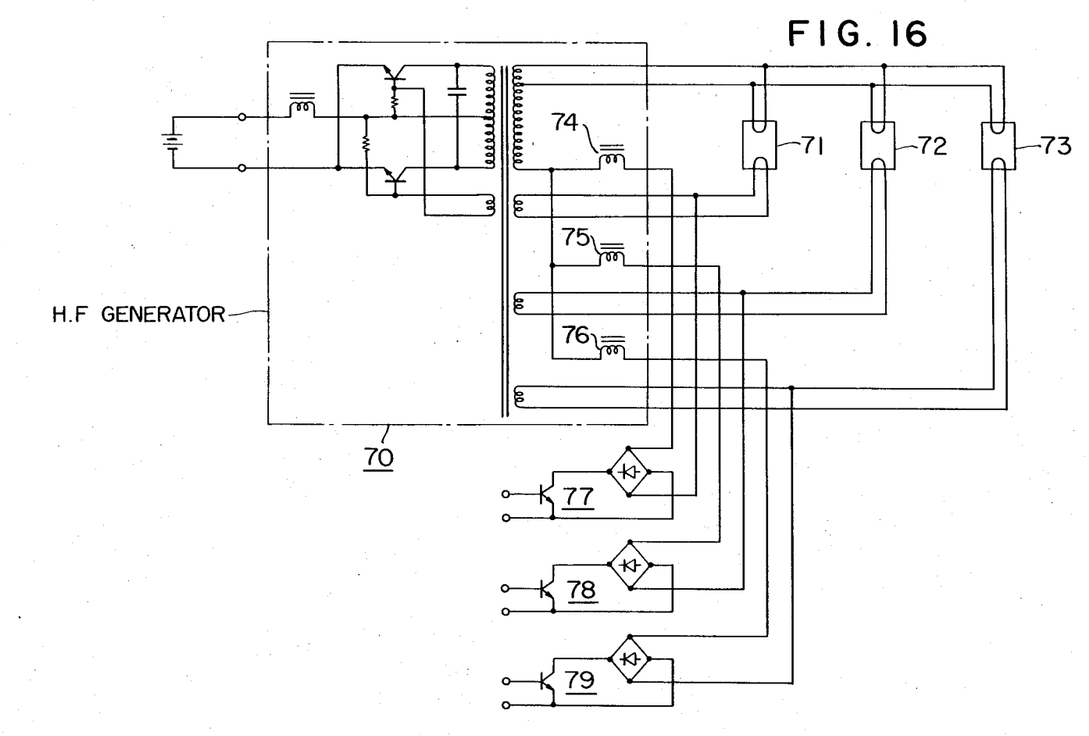
FIG. 16 is a connection diagram showing display elements and switch devices.

FIG. 16 shows one example in which three discharge lamps 71–73 are energized by a single high frequency generator 70 having the same construction as that shown in FIG. 8 except that three discharge lamps 71–73 are connected in parallel on the output side. In series with respective discharge lamps are connected current limiting devices 74–76. Switches 77–79, each including a diode bridge and a transistor, are provided for respective discharge lamps. The purpose of these switches 77–79 is to control supply of high frequency voltage to discharge lamps 71–73 in accordance with image signals. This embodiment has an advantage of decreasing the number of the high frequency generators. This modification is suitable for energizing three discharge lamps emitting red, green and blue color lights to make a color display as in FIGS. 6 and 7, for example.

Figure 17A:
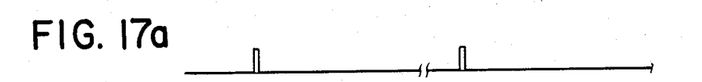
FIGS. 17a, 17b and 17c show waveforms useful to explain the operation of a high frequency generator.
Figure 17B:
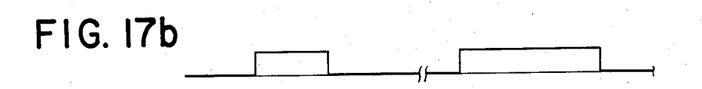
Figure 17C:
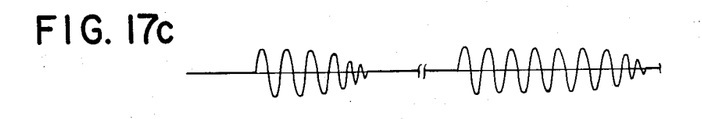

FIG. 17a shows the period of the image signal, FIG. 17b shows the output voltage of the high frequency generator and FIG. 17c the transient condition of the inverter transformer of the high frequency generator. With the high frequency generator shown in FIG. 9 or 13, each discharge lamp is supplied with the high frequency voltage at a predetermined phase thereof, that is the oscillation starting phase as shown in FIG. 17c. Thus, the lamp current flowing through all discharge lamps are the same so that all discharge lamps produce the same quantity of light. Although as shown in FIG. 17c, the output of the high frequency generator continues after turning the switch OFF. This is caused by the transient response of the inverter transformer, but since this transient response is substantially constant, light output is also substantially constant.

Figure 18:
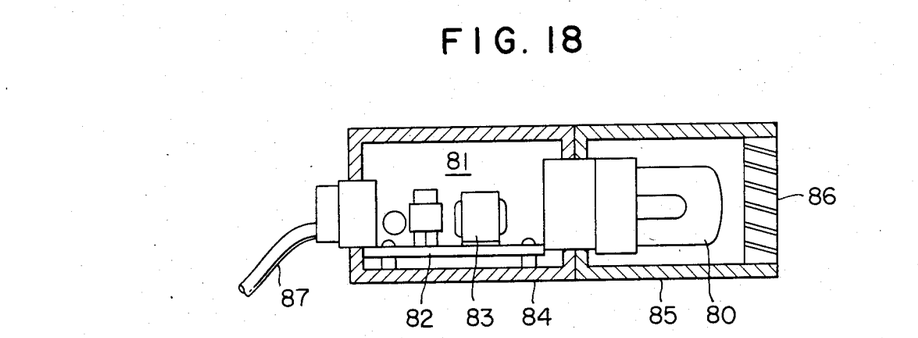
FIG. 18 is a side view, partly in section, showing one example of the arrangement of the discharge lamp and the high frequency generator.

FIG. 18 shows one example of the construction of the discharge lamp 80 and the high frequency generator 81 including component elements disposed on such substrate 82 as a printed board and contained in a cylindrical casing 84. The discharge lamp 80 is bent into a U shape and contained in a cylindrical casing 85 having the same diameter as the casing 84. A suitable shader 86 may be provided for the light projecting opening of the casing 85. Casings 84 and 85 are mechanically connected together by a suitable connector, not shown. Numeral 87 designates a connecting wiring to an external power source or signal source.

The discharge lamp and the high frequency generator shown in FIG. 17 can readily be mounted on or dismounted from the display board A. Moreover, change of the discharge lamp and/or high frequency generator can be made readily. Further, since the discharge lamp and the high frequency generator are disposed closely, attenuation of the high frequency voltage due to a wiring therebetween can be minimized.

It should be understood that this invention is not limited to the specific embodiments described above and that many changes and modifications can be made. For example, the high frequency generator may be different from those shown in FIGS. 8–12, provided that it can produce high frequency voltage capable of decreasing the attenuation time of a transient oscillation. Regarding the control device, instead of comparing an analogue signal with a saw tooth wave as in the foregoing embodiments, a digital signal produced by an A/D converter may be compared. It is also possible to sequentially scan a plurality of display elements by using a system disclosed in Japanese Patent Publication No. 20845/1966. Further, it is possible to temporarily store in a memory device control contents of respective display elements for simultaneously controlling all display elements at each image.

According to this invention, since each of a number of display elements arrayed on an electroluminescent board is made up of a discharge lamp and a high frequency generator adapted to energize the discharge lamp it is possible to not only increase the operating life of the discharge lamp but also produce sufficient light output. Especially, as it is possible to use an inductor or capacitor as a current limiting device, power loss and heat generation thereof can be greatly reduced. In addition, as it is possible to decrease the inductance or capacitance of the inductor or capacitor, a predetermined degree of light control can be realized with a lesser influence of a transient oscillation which not only decreases the difference among a plurality of discharge lamps but also improves the response characteristics to image signals, thereby providing a high quality image display. In addition, as it is possible to decrease the size and weight of the current limiting device it can be housed in the display board together with the discharge lamp and other elements. For example, where an inductor is used as the current limiting device and where the discharge lamp is lighted with high frequency voltage having a frequency of 60 KHz, the inductance of the inductor can be reduced to 1/1000 of that energized by 60 Hz commercial source voltage, and the attenuation time of the transient oscillation can also be reduced to 1/1000.

Where a discharge lamp is used, it is advantageous to always preheat its filaments as shown in FIG. 13 thereby to rapidly start the discharge lamp without shortening the life thereof. However, where a voltage sufficient to rapidly start the discharge lamp is applied, filament preheating is not always necessary although the life of the lamp is shortened more or less.

Where the frequency of the high frequency generator is 10 or more times of the commercial source frequency, the attenuation time of the transient oscillation is reduced to 1/10 so that the response speed to the image signal can be reduced and difference in the degree of light control between respective discharge lamps can also be reduced. However, in order to prevent loss caused by switching transistors or thyristors and audible noise band, 20 to 50 KHz is suitable for the output voltage of the high frequency generator.

We claim:

1. Image display apparatus comprising:
   a display board on which a plurality of luminous elements are arrayed;
   means for generating a video signal indicative of a video image to be displayed by said display board;
   control means responsive to said video signal for generating control signals establishing periods of lighting of said respective luminous elements required to produce an intensity corresponding to said video signal;
   each of said display elements comprising a low pressure gas discharge lamp; and
   high frequency generator means controlled by said control means for supplying high frequency power to said low pressure gas discharge lamps, said frequency being sufficiently high to decrease an attenuation time of a transient oscillation of said display elements.

2. The image display apparatus according to claim 1 wherein three discharge lamps respectively emitting red, green and blue color lights are disposed closely adjacent to form one picture element.

3. The image display apparatus according to claim 1 wherein said high frequency generator generates a high frequency voltage having a frequency of 20 to 50 KHz.

4. The image display apparatus according to claim 1 wherein said high frequency generator is provided for each discharge lamp.

5. The image display apparatus according to claim 1 wherein said high frequency generator is provided for two or more discharge lamps.

6. The image display apparatus according to claim 1 wherein said high frequency generator comprises a rectifier for rectifying voltage of a commercial alternating current source to produce a rectified voltage signal, and an inverter which converts said rectified voltage signal into a high frequency AC voltage.

7. The image display apparatus according to claim 1 wherein said control menas includes means for varying an interval in which output of said high frequency generator is supplied to said discharge lamp at each frame of the video image represented by said video signal generated by said video signal generator.

8. The image display apparatus according to claim 1 wherein said control means includes means for varying a magnitude of the output voltage of said high frequency generator in accordance with said video signal at each frame of said video image represented by said video signal generated by said video signal generator.

9. The image display apparatus according to claim 1 wherein said high frequency generator comprises a self exciting type inverter.

10. The image display apparatus according to claim 1 wherein said high frequency generator comprises a separate exciting type inverter.

11. The image display apparatus according to claim 1 wherein said high frequency generator comprises control means for starting and stopping the operation thereof in accordance with said video signal.

12. The image display according to claim 1, wherein the frequency of the high frequency generator means is substantially greater than frequency of the video signal.

* * * * *